Inventor:
Francis X. Rettenmeyer

Patented July 19, 1927.

1,636,436

UNITED STATES PATENT OFFICE.

FRANCIS X. RETTENMEYER, OF NEW YORK, N. Y., ASSIGNOR TO BELL TELEPHONE LABORATORIES, INCORPORATED, OF NEW YORK, N. Y., A CORPORATION OF NEW YORK.

SYSTEM FOR WAVE ANALYSIS.

Application filed November 7, 1925. Serial No. 67,649.

This invention relates to a system for wave analysis and more particularly to a method and means for determining the ratio of unmodulated carrier to the sideband component of the modulated carrier, or as it is generally termed in radio practice, the degree of modulation.

In carrier transmission systems it is in general desirable to know the ratio of the amplitude of the unmodulated carrier to that of the modulated carrier component or sideband in order that proper adjustments may be made to insure transmission in which the reproduced signal is not appreciably distorted.

Should the ratio of carrier to sideband fall below a certain minimum value the received signal will be distorted in the receiving detector due to lack of sufficient carrier for proper detection unless the proper quantity of carrier be supplied at the receiving terminal. It is difficult in practice to maintain the carrier at the necessary amplitude due to possible variations in the output current of different types of transmitting apparatus and changes in the transmission medium.

Various methods have been suggested for determining this ratio, such as calibrating the transmitting apparatus, or by using filters to select the sidebands and the carrier which are then impressed upon separate channels and measured.

The first mentioned method is adapted to give only approximate values since the input may not always remain constant. It is subject to change in accordance with line conditions and other variations occurring in the system. Furthermore, this method does not take into account variations in the electrical properties of the apparatus itself, since the signal is measured in the input circuit of the transmitter and not in the transmission circuit or line. The second mentioned method is impracticable, inasmuch as the frequency spacing between unmodulated and modulated carrier components is normally so small that complete separation by means of filters is extremely difficult.

In order to properly insure that the quality of the transmitted signal shall not fall below a given standard it is desirable to determine the amplitude of both the sideband component and the unmodulated component of the carrier and to control the ratio of the amplitudes of these components during the operation of the system and under operating conditions, in such manner that the ratio will not decrease below a certain minimum value as determined by the apparatus involved and the desired quality of transmission.

An object of the invention is to utilize a modulated carrier wave to produce indications from which the ratio of the amplitudes of its components may be ascertained. Another object is to permit the ratio of the amplitudes of the carrier and sideband components of a modulated carrier wave present in a transmission circuit to be ascertained. A still further object is to measure the amplitudes of the carrier and sideband components transmitted in a signaling system.

A feature of the invention is to provide an arrangement in which the modulated wave may be directly used to indicate the ratio and amplitudes of its modulated and unmodulated components.

These objects and others, which will be apparent as the nature of the invention is disclosed, are accomplished in accordance with this invention by impressing the wave to be analyzed upon two channels. In one channel is included a peak voltmeter or an amplifier, according to the system employed, and in the second channel is included a detector. The indications produced in the two channels vary in accordance with different laws as the relative proportions of carrier and sideband currents are varied and, accordingly, from a comparison of the two indications in any particular case, it is possible to arrive at the respective values of the two currents.

Although the novel features which are believed to be characteristic of this invention will be pointed out with particularity in the claims appended hereto, the invention itself, as to its objects and advantages, the mode of its operation, and the manner of its organization may be better understood by referring to the following description taken in connection with the accompanying drawing forming a part thereof in which;

Figure 1:
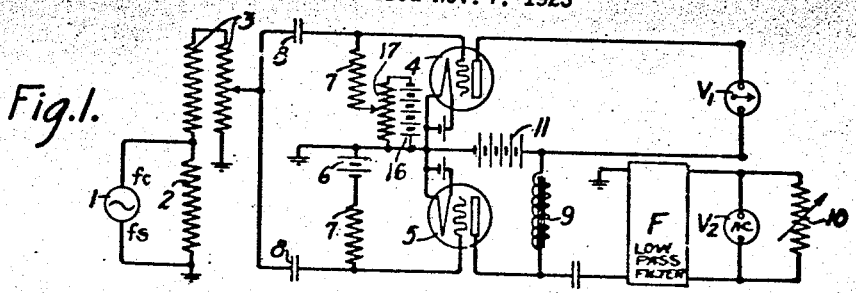
Fig. 1 is a diagrammatic representation of one embodiment of this invention.

In Fig. 1 is shown a source 1 of waves to be analyzed. Although source 1 is represented in the drawing as a generator it is intended to represent in a general manner any source of waves to be measured which may be a transmission line, or the output circuit of a radio transmission system. Current from source 1 is passed through resistance 3 which is in multiple with load, resistance 2 and which should be of sufficiently high value to prevent short-circuiting the source and to insure a negligible power loss to the transmitting circuit. This resistance device may be coupled to the supply source in any acceptable manner. The potential developed across resistance 2 is impressed upon potentiometer 3, connected in parallel with load resistance 2, which controls the energy transferred to the input circuits of space discharge devices 4 and 5. Device 4 operates as a peak voltmeter of the type disclosed in U. S. patent to Heising 1,232,919, issued July 10, 1917. Polarizing potential is supplied to the grid from battery 16 through potentiometer 17 and resistance 7. The space current is furnished by battery 11 and is indicated by the galvanometer $V_1$. In the normal condition, potentiometer 17 is adjusted so that the negative potential on the grid is just sufficient to reduce the space current to zero. When a wave from the source 1 is impressed on the grid, the space current balance is disturbed and may be restored by adjusting potentiometer 17 to increase the negative potential on the grid by an amount equal to the maximum, or peak, voltage of the wave. The value of the peak voltage may then be estimated in the ordinary manner from the change in the setting of the potentiometer.

Device 5 functions as a detector, or modulator, of the type in which modulation is effected by the non-linearity of the current-voltage characteristic. The principles underlying the operation of detectors of this type, to which the name "square law" detector has been applied, are discussed at length in U. S. patent to Carson 1,448,702, issued March 13, 1923, and also in the proceedings of the Institute of Radio Engineers, vol. 7, No. 2, April, 1919, pages 187 to 200. A salient characteristic of the square law detector is that signal frequency is reproduced with an amplitude proportional to the product of the carrier wave amplitude and the amplitude of the sideband current. The grid of device 5 is polarized at a suitable potential by means of battery 6 and resistance 7. Blocking condensers 8 prevent current from the grid batteries from flowing to ground through potentiometer 3.

The anode circuit of space discharge device 5 is connected to A. C. voltmeter $V_2$ through filter F which is adapted to pass signal frequency currents only. Signal frequency choke coil 9 prevents signal frequency currents from passing through source 11. Variable resistance 10, connected in shunt to voltmeter $V_2$, may be adjusted for calibration purposes.

Figure 2:
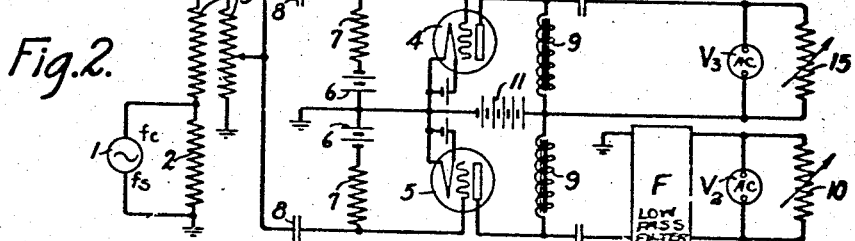
Figs. 2 and 3 show modifications thereof.

In the system shown in Fig. 2, elements corresponding to those shown in Fig. 1 are indicated by similar reference numerals. In this system the circuit arrangement is similar to that shown in Fig. 1, but space discharge device 4 is operated as an amplifier instead of as a peak voltmeter. Choke 9 is inserted between source 11 and the anode of amplifier 4 to prevent amplified alternating currents being short-circuited around meter $V_1$ which in this case is an A. C. voltmeter.

Figure 3:
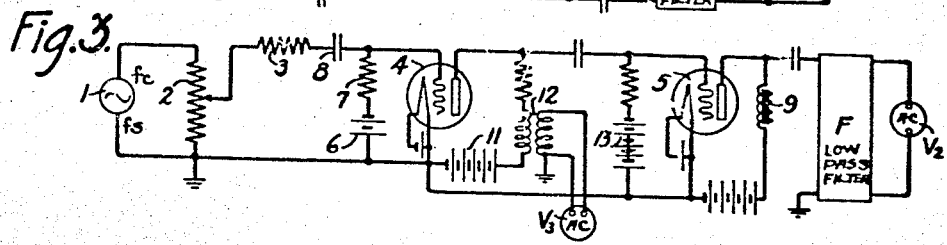

The system of Fig. 3 is similar to that of Fig. 2 and corresponding parts are identified by similar reference characters. In this system, however, the amplifier channel and the channel including a detector are connected in tandem instead of in parallel as in Figs. 1 and 2.

Meter $V_3$ is coupled by transformer 12 to the output circuit of amplifier tube 4. Grid polarizing potential is supplied to detector tube 5 by source 13.

The operation of this system is similar to that of Fig. 2 as will be hereinafter set forth.

Figure 4:
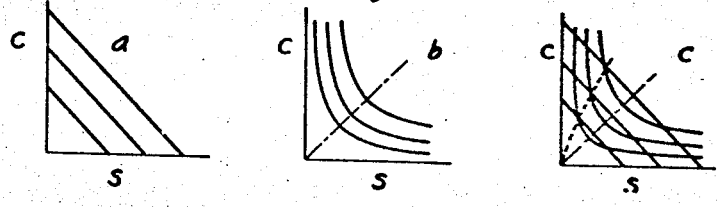
Figs. 4 and 5 show a series of curves to be used in explanation of the operation of the systems shown in Figs. 1 and 2.

The operation of the above described systems may be explained by referring to the series of curves for an ideal system shown in Fig. 4. The physical circuit will in general have slightly different characteristics than those shown, although the following characteristics are good approximations. Voltmeter $V_1$ of Fig. 1 will indicate peak voltage values only which, in the case of a modulated carrier system, correspond to the carrier plus the side-band or C+S. For a given value of the peak voltage the carrier wave amplitude C and sideband wave amplitude S may have widely ranging values. Various values of C and S are shown in diagram $a$ of Fig. 4, in which C is plotted as a function of S when $C+S=K_1$, $K_2$, and $K_3$. Voltmeter $V_2$, being in the plate circuit of a square law detector, registers the product of C and S or CS. Values of C and S when $CS=L_1$, $L_2$, and $L_3$ are plotted in diagram $b$, Fig. 4. The value of C+S being determined by the peak voltmeter and the value of CS being determined by voltmeter $V_2$, the absolute values of the amplitudes of the unmodulated components and the side-band component may be found by superimposing the curves of $a$ and $b$ as shown in diagram $c$, Fig. 4, since these values will be identified by the point at which these curves intersect. These values may also be determined by solving the two equations $C+S=K_1$ and $CS=L_1$. Although these curves intersect at two points, no confusion will arise as the carrier is normally greater in amplitude than the side-band.

Figure 5:
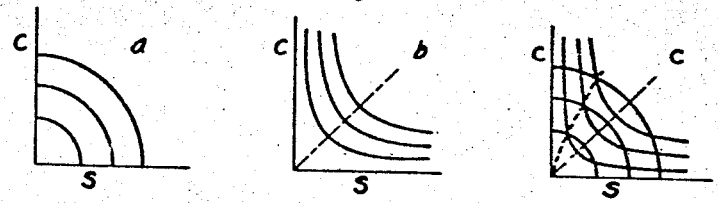

The operation of the systems shown in Figs. 2 and 3 will be apparent from the series of curves shown in Fig. 5. Voltmeter $V_3$ being an alternating current instrument will indicate the value of $$\sqrt{C^2+S^2},$$

the relationship between C and S for various constant values $K_1$, $K_2$ and $K_3$ of the $$\sqrt{C^2+S^2}$$

being shown by the curves $a$ of Fig. 5. Voltmeter $V_2$ will indicate the value of CS in the same manner as the voltmeter $V_2$ as shown in Fig. 1. In superposing curves $a$ and $b$ of Fig. 5, the absolute values of C and S will be determined as shown by curves $c$, or the two equations $C^2+S^2=K_1^2$ and $CS=L_1$ may be solved for C and S. Voltmeter $V_2$ of Figs. 2 and 3 may, however, be calibrated to read the ratio of carrier to sideband provided potentiometer 3 is adjusted in such a manner that a given deflection of voltmeter $V_3$ is obtained when the wave to be measured is impressed thereon. In this case the deflection of voltmeter $V_2$ is noted and the ratio determined by referring to a chart or by having voltmeter $V_2$ graduated to read the ratio direct.

By means of the above described systems the actual amplitudes of the modulated and unmodulated components of a wave in the transmission line or in the output circuit of a radio transmitting apparatus may be determined.

The system is adapted to operate at various frequencies, consequently a modulated carrier wave comprising components of different frequencies may be measured as readily as a single tone and the apparatus may be calibrated to read directly the ratio to be ascertained.

The above described apparatus is particularly adapted for use in radio broadcast installations where the ratio of the carrier to the side-band in the radiated wave must be constantly observed and the broadcast operator must be relied upon to make this determination.

A direct reading meter, such as this invention provides, is essential where the measuring apparatus is to be operated in connection with commercial transmitting installation by persons not skilled in laboratory measurements.

Although this invention has been shown and described as applied to a particular system, it is not to be limited thereto but only in accordance with the scope of the invention as defined by the following claims.

What is claimed is:

1. The method of determining the degree of modulation of a carrier wave which comprises producing an indication proportional to a summation effect of the component wave amplitudes, and producing a second indication proportional to the product of the component wave amplitudes, whereby the amplitudes of the components may be separately ascertained.

2. The method of ascertaining the ratio of the carrier amplitude to the sideband wave amplitude in a signal modulated carrier wave which comprises producing an indication corresponding to the sum of the square of the component wave amplitudes, and producing a second indication proportional to the product of the component wave amplitudes whereby the amplitudes of the components may be separately determined.

3. In a system for determining the degree of modulation of a signal modulated carrier wave, a pair of transmission channels, means in one channel for determining a summation effect of the wave components, and means in the other channel to determine an effect proportional to the product of the component wave amplitudes.

4. In a system for determining the ratio of carrier to side-band in a modulated carrier wave, a pair of transmission channels, means for impressing said wave thereon, one of said channels including an amplifier, the other of said channels including a detector, and means for indicating the amplitude of the resultant wave in each of said channels.

5. A system for determining the value of certain components of a transmitted wave which comprises a pair of transmission channels, means for impressing said wave thereon, a space discharge amplifier included in one of said channels, a space discharge detector included in the other of said channels, and indicating apparatus included in the output circuits of said space discharge devices whereby the ratios of the desired components may be determined.

In witness whereof, I hereunto subscribe my name this 31st day of October A. D., 1925.

FRANCIS X. RETTENMEYER.